United States Patent [19]
Matsumura

[11] 3,825,799
[45] July 23, 1974

[54] ANTI-SKID CONTROL SYSTEM FOR VEHICLES

[75] Inventor: Yoshihiro Matsumura, Yokosuka, Japan

[73] Assignee: Sohgoh Jidosha Azen Kogai Gijutsu Kenkyu Kumiai, Tsuchiyama, Himeji, Japan

[22] Filed: Aug. 2, 1973

[21] Appl. No.: 385,071

[30] Foreign Application Priority Data
Nov. 10, 1972  Japan.............................. 47-112154

[52] U.S. Cl. .................................................. 317/5
[51] Int. Cl............................................... B60t 8/08
[58] Field of Search ........................................ 317/5

[56] References Cited
UNITED STATES PATENTS

| | | | |
|---|---|---|---|
| 3,351,811 | 11/1967 | Buckley et al. ......................... | 317/5 |
| 3,414,770 | 12/1968 | Pudewill ................................ | 317/5 |
| 3,650,575 | 3/1972 | Okamuto ............................... | 317/5 |
| 3,710,186 | 1/1973 | Sharp .................................... | 317/5 |
| 3,719,399 | 3/1973 | Adahan .................................. | 317/5 |

*Primary Examiner*—L. T. Hix
*Attorney, Agent, or Firm*—Bosworth, Sessions & McCoy

[57] ABSTRACT

An anti-skid control system for vehicles comprising a wheel speed detector, a converter consisting of a pulse generator and an integrator, an approximate vehicle body speed signal generator including an RC discharge circuit, and a comparator for comparing the output of the approximate vehicle body speed signal generator with the output of the converter for energizing and deenergizing a solenoid operated valve in the brake fluid pressure control means. The integrator includes a charging resistor and a discharging resistor whose resistance ratio is suitably selected so that the output of the converter varies substantially as an exponential function of the input frequency applied thereto thereby obtaining an approximate vehicle body speed having substantially constant deceleration.

4 Claims, 6 Drawing Figures $E = E_0 e^{-\frac{t}{T}}$ $E' = b e^{-\frac{F}{T_a}}$

ANTI-SKID CONTROL SYSTEM FOR VEHICLES

This invention relates to an anti-skid control system for vehicle for preventing undesirable locking of the wheels occurring when the brake is abruptly applied to the vehicle during running on ground such as wet asphalt ground, snow-laden ground or frozen ground and controlling the rotation of the wheels so as to provide optimum adhesion between the wheels and the ground surface, thereby reducing the braking distance and preventing the danger of irregular gyration of the vehicle body.

Anti-skid control systems for controlling the wheel speed are broadly classified into the type in which the wheel deceleration is detected and compared with a reference setting for controlling the brake and the type in which means for generating a signal representative of the approximate vehicle body speed is disposed in the system and this approximate vehicle body speed is compared with the wheel speed for controlling the brake.

The present invention concerns with improvements in the anti-skid control system of the latter type. In one of the prior art anti-skid control systems of this latter type, the approximate vehicle body speed has been obtained by an approximate vehicle body speed signal generator of the type in which the signal representative of the wheel speed detected when the brake is initially applied or when the wheel speed is restored to an extent that any appreciable slip does not occur between the wheels and the ground surface, is applied to a capacitor to be stored therein as the voltage representative of the vehicle body speed, and the capacitor is discharged with a constant current corresponding to a constant deceleration. This prior art system has however been defective in that the discharge current in the constant current discharge circuit tends to be adversely affected by the temperature dependency of electronic elements, especially transistors.

Another system of this type has been proposed in which an approximate vehicle body speed signal generator including an RC discharge circuit is employed in place of the approximate vehicle body speed signal generator consisting of the capacitor and constant current discharge circuit above described. As is commonly known, the discharge gradient is steep when the voltage is high and gentle when the voltage is low in the system employing such RC discharge circuit due to the fact that the discharge current is an exponential function of the voltage. In the prior art system of this kind, the input voltage applied to the approximate vehicle body speed signal generator is proportional to the wheel speed and the RC discharge circuit discharges to provide the approximate vehicle body speed. It has thus been unable to obtain the desired approximate vehicle body speed with good precision due to the fact that the deceleration setting therefor, is excessively large when the wheel speed is high, and conversely, it is excessively small when the wheel speed is low. Therefore, the approximate vehicle body speed signal generator employing the RC discharge circuit could only be utilized as an auxiliary control means.

Further, in the prior art systems utilizing the approximate vehicle body speed for the control of the wheel speed, the brake has been generally relaxed when the wheel speed is reduced to a value less than the approximate vehicle body speed, and the application of the brake has been started at the time at which the wheel speed is restored to the level of the approximate vehicle body speed again. The prior art systems have however been defective in that the brake tends to be relaxed excessively resulting in the extension of the braking distance. In an effort to obviate the above defect, means for detecting the wheel acceleration and starting the application of the brake when the wheel speed starts to increase or means for applying the brake again in a predetermined period of time after the relaxation of the brake has been additionally employed in the prior art systems. However, these means have also been defective in that, in the case of the former means, a complex mechanism is required, and in the case of the latter means, the brake relaxation timing must be changed depending on ground offering high adhesion or low adhesion and the wheel speed cannot be restored when the wheels are locked against rotation due to an abrupt change of the ground surface condition.

A differential amplifier has been generally employed to act as a comparator for comparing the signal representative of the wheel speed with the signal representative of the approximate vehicle body speed, and the individual inputs have been applied to the differential amplifier through circuits which are independent of each other. In order that these inputs can be precisely compared with each other, it has been necessary to improve the precision of the inputs representative of the wheel speed and approximate vehicle body speed thereby improving the relative precision of these inputs.

The present invention contemplates the provision of an anti-skid control system which obviates various defects of prior art anti-skid control systems as above described and which is simple in circuitry and can operate with improved performance. More precisely, the present invention provides improvements in the invention disclosed in U.S. Ser. No. 329,353.

It is an object of the present invention to provide an anti-skid control system for vehicles comprising wheel speed detecting means for generating a signal having a frequency proportional to the rotating speed of the wheel or propeller shaft, converting means consisting of means for generating a train of pulses having a frequency proportional to the frequency of the signal generated by said wheel speed detecting means and integrating means connected to the output of said pulse train generating means for convertng the signal representative of the rotating speed of the wheel or propeller shaft into a d.c. voltage, approximate vehicle body speed signal generating means including an RC discharge circuit for generating a signal representative of an approximate vehicle body speed due to the discharge occurring in the RC discharge circuit when the rate of reduction of the output of said converting means exceeds the discharge gradient determined by the time constant of said RC discharge circuit, and comparing means for comparing the output of said approximate vehicle body speed signal generating means with the output of said converting means, said integrating means including a charging resistor and a discharging resistor having a suitably selected resistance ratio therebetween so that the output voltage of said converting means can vary approximately as an exponential function of the input frequency applied thereto, whereby the approximate vehicle body speed having a substantially constant deceleration can be obtained by the discharge occurring in said RC discharge circuit.

Another object of the present invention is to provide an anti-skid control system in which a vehicle body deceleration switch detects the vehicle body deceleration by comparing same with a plurality of settings, and the discharge gradient for the voltage representative of the approximate vehicle body speed, hence the decelerating setting for the approximate vehicle body speed is changed over to one of a plurality of values depending on the adhesion offered by ground so as to obtain the approximate vehicle body speed which meets all the conditions of ground including ground offering high adhesion and ground offering low adhesion.

Still another object of the present invention is to provide an anti-skid control system in which the discharge gradient for the voltage representative of the approximate vehicle body speed is changed over to a suitable greater value when the brake relaxing signal appears and lasts for more than a predetermined period of time, thereby preventing excessive relaxation of the brake and ensuring restoration of the wheel speed.

Yet another object of the present invention is to provide an anti-skid control system in which a brake switch is connected to the approximate vehicle body speed signal generating means through a timing circuit for changing over the discharge gradient to a suitable larger value when no brake is applied to the vehicle and during a predetermined period of time after application of the brake so as to prevent undesirable appearance of an erroneous or spurious brake relaxing signal due to noise occurring in the wheel system or drive system in the state in which no brake is applied to the vehicle, and to prevent undesirable appearance of an erroneous or unnecessary brake relaxing signal due to transient oscillation of the wheel speed occurring in the initial stage of application of a spike brake or especially abrupt brake and due to a delay in the change-over of the deceleration setting resulting from the rigidity of the vehicle body or delayed response of the vehicle body deceleration switch.

The above and other objects, features and advantages of the present invention will be apparent from the following detailed description taken in conjunction with the accompanying drawings, in which.

Figure 1:
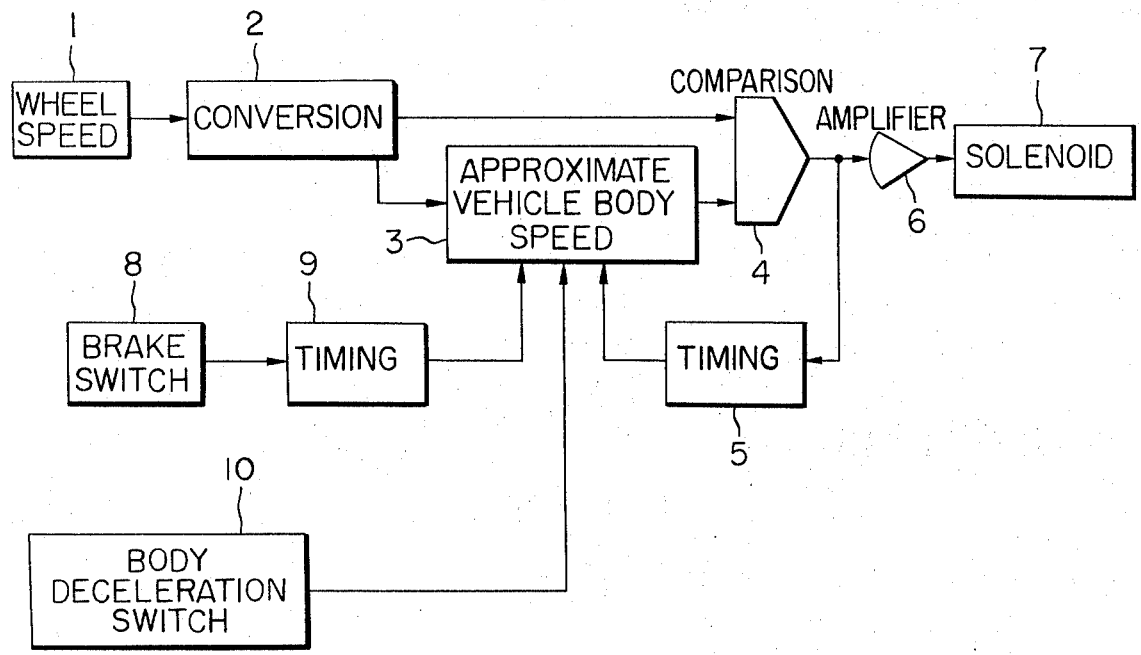
FIG. 1 is a block diagram of an anti-skid control system according to the present invention.

Referring to FIG. 1, a wheel speed detector 1 detects the rotating speed of the wheel or propeller shaft of a vehicle and generates an a.c. voltage having a frequency proportional to the rotating speed of the wheel or propeller shaft. A converter 2 is connected to the wheel speed detector 1 and is composed of a pulse train generator and an integrator. The pulse train generator generates a train of pulses having the same frequency as the a.c. output voltage of the detector 1 and these pulses have the same level and pulse width. The integrator generates an output voltage which varies relative to the input frequency with a functional relationship as will be described in detail later.

An approximate vehicle body speed signal generator 3 is composed of a capacitor for memorizing the approximate vehicle body speed, a transistor 28 (FIG. 6) which acts to charge the capacitor with the current corresponding to the output of the converter 2 but prevents discharge of the capacitor to the convertor 2, and a plurality of resistors through which the charge stored in the capacitor in discharged.

When no brake is applied to the steady running vehicle or in a generally lightly braked condition which will not require the operation of the anti-skid system, the rate of reduction of the output of the converter 2 is less than the discharge gradient which is determined by the capacitance C of the capacitor and composite resistance R of the resistor group in the RC discharge circuit in the approximate vehicle body speed signal generator 3. Thus, current is continously supplied from the converter 2 to the capacitor through the transistor 28 to maintain the output of the approximate vehicle body speed signal generator 3 at the same value as the output of the converter 2. However, when a strong braking force which causes operation of the anti-skid system is imparted and the wheel deceleration exceeds a reference value or predetermined setting for the approximate vehicle body speed, the rate of reduction of the output of the converter 2 exceeds the discharge gradient of the RC discharge circuit in the approximate vehicle body speed signal generator 3 with the result that the supply of charging current from the converter 2 to the approximate vehicle body speed signal generator 3 is ceased and the approximate vehicle body speed signal generator 3 generates an approximate vehicle body speed signal which is determined by the time constant of the RC discharge circuit.

A comparator 4 compares the output of the approximate body speed signal generator 3, hence the approximate vehicle body speed signal with the output of the converter 2 and generates a brake relaxing signal only when the latter input is smaller than the former input. In response to the appearance of the brake relaxing signal from the comparator 4, a power amplifier 6 amplifies this signal to energize a solenoid 7 of a solenoid operated valve in the brake fluid or oil pressure control means (not shown) thereby relaxing the brake fluid pressure for relaxing the brake.

The brake relaxing signal generated by the comparator 4 is applied to the approximate vehicle body speed signal generator 3 through a timing circuit 5, and a signal appearing from a brake switch 8 is also applied to the approximate vehicle body speed signal generator 3 through a timing circuit 9 in addition to the output of the converter 2. A signal appearing from a vehicle body deceleration switch 10 is also applied to the approximate vehicle body speed signal generator 3. These signals are used for changing the discharge gradient of the RC discharge circuit in the approximate vehicle body speed signal generator 3, hence the deceleration setting for the approximate vehicle body speed. This change in the discharge gradient is attained by changing over the value of the discharge resistance in the RC discharge circuit.

The brake switch 8 operates in interlocking relation with the brake pedal. This brake switch 8 is a conventional one which generates a signal continuously during the period of time in which the brake is kept applied.

The vehicle body deceleration switch 10 compares the deceleration of the vehicle body with a plurality of reference values stored therein and generates a multiple-level signal whose level is variable depending on the vehicle body deceleration. This switch 10 may be a deceleration switch utilizing a conventional pendulum, a mercury switch sensitive to deceleration, or any other suitable switch. In the present invention it is supposed that only one reference value is stored in the switch 10, and this reference value is set at, for example, 0.4G (G is the acceleration of gravity).

The switch 10 applies a high-adhesion ground signal and a low-adhesion ground signal to the aproximate vehicle body speed signal generator 3 when the vehicle body deceleration is larger and smaller than this reference value respectively. When two or more reference values are stored in the switch 10, similar signals are generated depending on the vehicle body deceleration.

Figure 2:
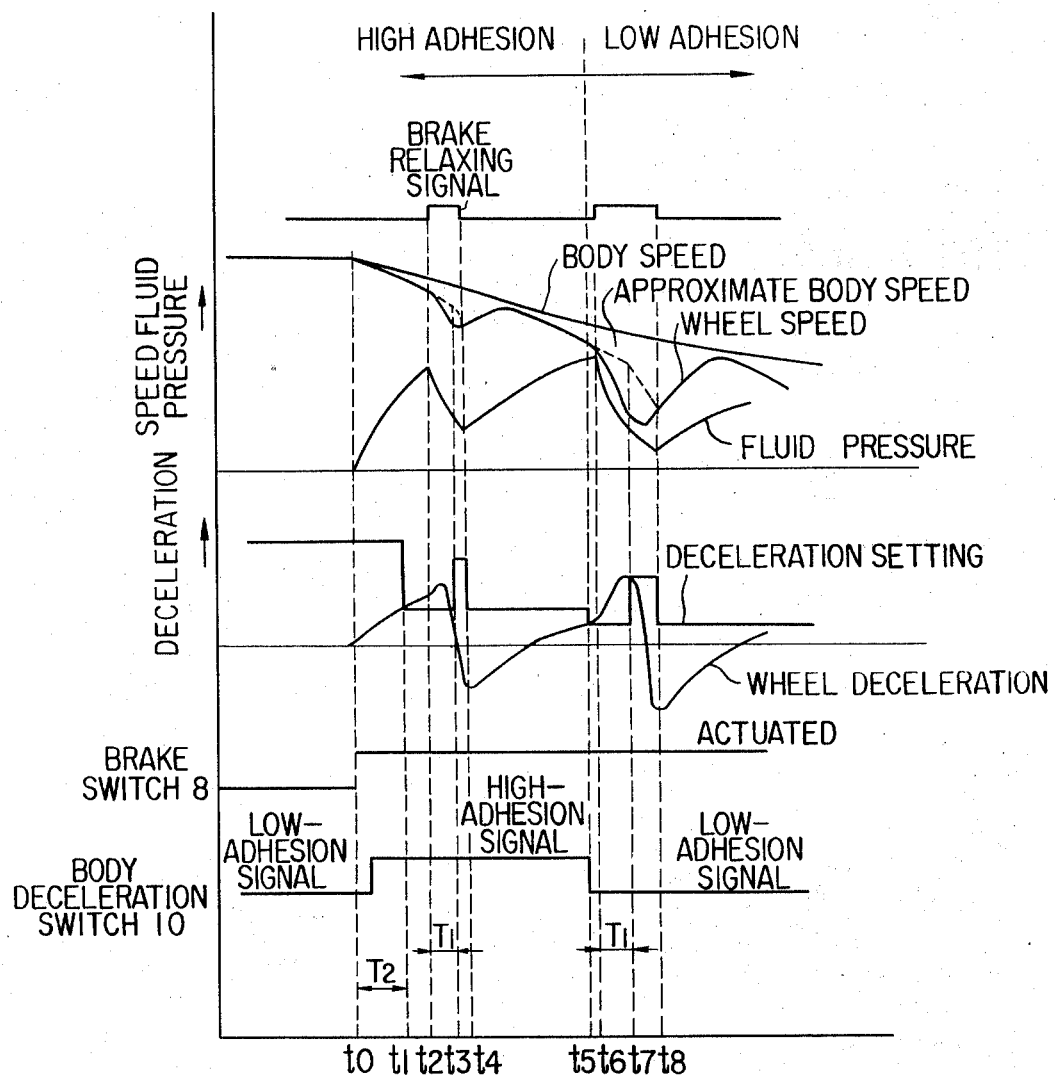
FIG. 2 shows diagrammatically the operation of the anti-skid control system.

The operation of the system according to the present invention will be described in detail with reference to FIGS. 1 and 2. FIG. 2 shows the operation of the anti-skid system in the case in which the brake is applied to the vehicle and the adhesion of ground changes from high to low during the application of the brake, so that the features of the present invention can be more clearly understood. In FIG. 2, in order to clearly illustrate the relation between the vehicle body speed, wheel speed and approximate vehicle body speed on the comparable basis, the output of the approximate vehicle body speed signal generator 3 is inversed relative to the functional relation between the input and output of the converter 2 so that the approximate vehicle body speed may be substantially proportional to the wheel speed. Thus, the approximate vehicle body speed which is given by the discharge occurring in the RC discharge circuit varies substantially rectilinearly and the gradient thereof gives a constant deceleration setting.

Before time $t_0$ in FIG. 2 in which the brake is not still applied to the vehicle, the brake switch 8 is not actuated and no signal is applied from the brake switch 8 to the approximate vehicle body speed signal generator 3. In this case, the deceleration setting for the approximate vehicle body speed, hence the discharge gradient of the RC discharge circuit, is set at a large value of, for example, 3.0 G. Such a large value is selected so as to prevent occurrence of an unnecessary brake relaxing signal in response to transient variations of the wheel speed due to the racing of the wheels during starting the vehicle and due to the play of the driving system during changing the gears in the transmission.

Suppose that the brake is applied at time $t_0$ to the vehicle running on ground offering high adhesion. The brake fluid pressure rises and the braking force is increased to reduce the wheel speed and vehicle body speed. When the vehicle body deceleration exceeds the reference value stored in the vehicle body deceleration switch 10, the vehicle body deceleration switch 10 acts to change over the deceleration setting for the approximate vehicle body speed to a value of, for example, 1.0 G which is selected for ground offering high adhesion. (In the present embodiment, it is assumed that only one reference value is stored in the vehicle body deceleration switch 10 for simplicity of description.) However, due to the fact that the brake switch 8 applies the signal to the approximate vehicle body speed signal generator 3 with a delay time $T_2$ of, for example, 1/5 second which is determined by the timing circuit 9, the deceleration setting for the approximate vehicle body speed is maintained during the period of time of from time to $t_0$ time $t_1$ at the large value which is the same as that appeared before the application of the brake. At time $t_1$, that is, in the period of time $T_2$ after time $t_0$, the decelaration setting for the approximate vehicle body speed is changed over to the value of, for example, 1.0 G selected for ground offering high adhesion.

It will thus be seen that the deceleration setting (discharge gradient) for the approximate vehicle body speed has the same large value as that appeared before the application of the brake and this setting is maintained during a predetermined period of time which is determined by the timing circuit 9 even after the application of the brake so as to prevent appearance of an erroneous or spurious brake relaxing signal to transient oscillation of the wheel speed occurring in the initial stage of application of a spike brake and due to a delayed response attributable to the rigidity of the vehicle body or inertia of the vehicle body deceleration switch 10 during the detection of the vehicle body deceleration. The length of the delay time $T_2$ provided by the timing circuit 9 and the magnitude of the deceleration setting for the approximate vehicle body speed are variable depending on the vehicle type and response characteristic of the vehicle body deceleration switch. Thus, in order that the anti-skid system can operate satisfactorily without being adversely affected by these values and mal-operation thereof due to noises can be avoided, the delay time $T_2$ and deceleration setting must be selected to lie within the range of 1/10 to 1/3 second and within the range of 2.0 to 4.0 G (for example, 3.0 G) respectively.

With the increase in the wheel deceleration, the wheel deceleration exceeds the deceleration setting for the aproximate vehicle body speed at time $t_2$. (In other words, the rate of reduction of the output of the converter 2 exceeds the discharge gradient of the RC discharge circuit in the approximate vehicle body speed signal generator 3 at time $t_2$). At this time $t_2$, the wheel speed is lower than the approximate vehicle body speed, and the brake relaxing signal appears from the comparator 4 to be applied to the power amplifier 6. This signal is amplified by the power amplifier 6 and energizes the solenoid 7 in the brake fluid pressure control means for relaxing the brake fluid pressure. At the same time, the brake relaxing signal is applied to the timing circuit 5 to be delayed by a period of time $T_1$ of, for example, 1/20 second. When this brake relaxing signal lasts for more than the period of time $T_1$, the signal is applied to the approximate vehicle body speed signal generator 3 at time $t_3$ with the delay time $T_1$ and the deceleration setting (discharge gradient) for the approximate vehicle body speed is changed over to a larger value of, for example, 2.5 G. Therefore, the wheel speed being restored by the brake relaxing signal is quickly increased until it is equal to the approximate vehicle body speed at time $t_4$. At this time $t_4$, the brake relaxing signal from the comparator 4 disappears and the brake fluid pressure is applied again by the brake fluid pressure control means.

Suppose then that the ground condition changes abruptly from high to low adhesion at time $t_5$. Due to the abrupt change from the high to low adhesion, the vehicle body deceleration is now smaller than the reference value stored in the vehicle body deceleration switch 10. The vehicle body deceleration switch 10 generates a low-adhesion ground signal and the deceleration setting for the approximate vehicle body speed is changed over to a value of, for example, 0.6 G selected for ground offering low adhesion. At time $t_6$, which does not substantailly differ from time $t_5$ but is shown displaced from time $t_5$ for convenience of description, the speed of the wheels is greatly reduced to such an extent that the wheel deceleration exceeds the deceleration setting 0.6 G for the approximate vehicle body speed. Due to the fact that the wheel speed is now lower than the approximate vehicle body speed, the brake relaxing signal appears again from the comparator 4 for relaxing the brake fluid pressure. At time $t_7$ after time $t_6$, the deceleration setting for the approximate vehicle body speed is changed over to a larger value again in the manner similar to that above described. This value is desirably smaller than that for the high-adhesion ground and may be, for example, 2.0 G. However, due to the fact that the wheel speed is considerably lower than the approximate vehicle body speed at time $t_7$, it cannot be immediately increased to the level of the approximate vehicle body speed. The wheel speed is restored until it is equal to the approximate vehicle body speed at time $t_8$, and at this time $t_8$, the brake relaxing signal disappears so that the brake fluid pressure, hence the brake is applied again.

In the present invention, the deceleration setting for the approximate vehicle body speed (discharge gradient) is changed over to a suitable larger value in a predetermined period of time (delay time $T_1$ determined by the timing circuit 5) after the appearance of the brake relaxing signal in the manner above described. This provides various advantages as described below. The wheel speed would not be so low compared with the approximate vehicle body speed in the normal operation of the anti-skid system in which the braking force imparted to the wheels is not especially large compared with the adhesion offered by ground. Thus, the wheel speed can be quickly increased to the level of the approximate vehicle body speed to cease the appearance of the brake relaxing signal by changing over the deceleration setting for the approximate vehicle body speed to a larger value in a predetermined period of time after the appearance of the brake relaxing signal. In other words, the appearance of the brake relaxing signal is limited to a predetermined period of time substantially equal to the delay time $T_1$ thereby preventing excessive relaxation of the brake. When the brake cannot be sufficiently relaxed with the brake relaxing period of time substantially equal to the delay time $T_1$, the deceleration setting for the approximate vehicle body speed is restored to the small value determined by the vehicle body deceleration switch 10 after the disappearance of the brake relaxing signal. Thus, the brake relaxing signal appears again at that time to relax the brake thereby preventing undesirable locking of the wheels.

Further when a spike brake is initially applied or when the adhesion of ground changes abruptly during the application of the brake, the wheel speed is considerably lower than the approximate vehicle body speed due to the fact that the braking force imparted to the vehicle is remarkably large compared with the adhesion offered by ground. In this case, the wheel speed is still considerably lower than the approximate vehicle body speed although the deceleration setting for the approximate vehicle body speed is changed over to a larger value after the delay time $T_1$, and the wheel speed would not be increased to the level of the approximate vehicle body speed until it is sufficiently restored. Therefore, the restoration of the wheel speed is ensured, and due to the fact that the approximate vehicle body speed is reduced with a steep gradient after the delay time and is considerably lower than the vehicle body speed, the brake would not be excessively relaxed.

Figure 3:
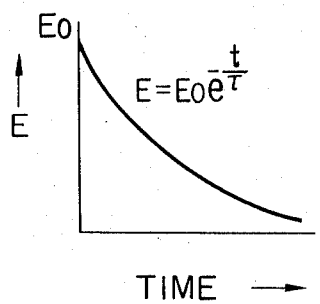
FIG. 3 is a graph showing the relation between the approximate vehicle body speed signal and time in the present invention.

The signal or voltage E representative of the approximate vehicle body speed in the present invention is generated by the RC discharge circuit as described previously. As shown in FIG. 3, the voltage E representative of the approximate vehicle body speed varies relative to time $t$ as an exponential function $$E = E_0 e^{-t/\tau}$$

where Eo is the voltage appeared immediately before the occurence of discharge and $\tau$ is the time constant determined by the RC combination. Therefore, the discharge gradient of the voltage E representative of the approximate vehicle body speed is given by $$dE/dt = -(1/\tau)\, E_o e^{-t/\tau} = -(1/\tau)\, E$$

and it is known that the discharge gradient is also an exponential function of the voltage. In order that this discharge gradient corresponds to the approximate vehicle body speed having constant deceleration, a functional relationship may be established between the input and the output of the converter 2 so that the output voltage of the converter 2 may be reduced exponentially when the input frequency of the converer 2 is reduced at a constant rate. (This is because the output of the converter 2 provides the input to the approximate vehicle body speed signal generator 3, and therefore, there is a 1 : 1 relationship between the output voltage of the converter 2 and the voltage representative of the approximate vehicle body speed.)

Figure 4:
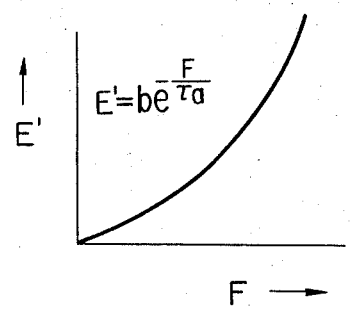
FIG. 4 is a graph showing the ideal relation between the input frequency and the output voltage of the converter in the present invention.

Suppose now that F is the input frequency of the converter 2, E' is the output of the converter 2, and ƒ is the transformation function therebetween, then the following equation holds:

$dF/dt = ƒ \times dE'/dt = ƒ \times -(1/\tau)\, E' = -a$ (a: proportional constant)
Thus, ƒ = $\tau a/E'$
and therefore,
$dF/dt = \tau a/E' = dE'/dt$
$E' = b e^{-F/\tau\, a}$ (b: proportional constant) This relation is shown in FIG. 4. It will thus be seen that the approximate vehicle body speed having constant deceleration can be obtained by the discharge of the RC combination by transforming the output voltage of the converter 2 so that it is an exponential function of the input frequency.

Figure 5:
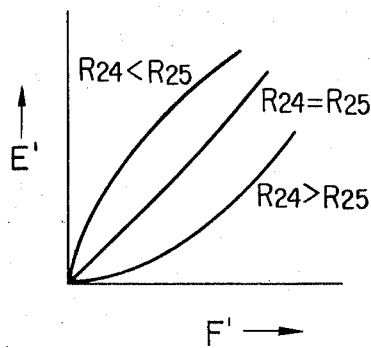
FIG. 5 is a graph showing the relation between the input frequency and the output voltage of the integrator in the present invention.

This functional relationship between the input and the output of the converter 2 can be simply and approximately precisely obtained by suitably selecting the resistance ratio between a charging resitor resistor 24 and a discharging resistor $R_{25}$ (FIG. 6) in the integrator in the converter 2. FIG. 5 shows relation between the input frequency F and the output voltage E' at different resistance ratios between the charging resistor $R_{24}$ and the discharging resistor $R_{25}$ in the integrator. It will be seen from FIG. 5 that the relation is rectilinear when $R_{24} = R_{25}$.

When $R_{24} < R_{25}$, the rate of variation of the output voltage relative to the input frequency decreases with the increase in the input frequency. When $R_{24} > R_{25}$, the rate of variation of the output voltage relative to the input frequency increases with the increase in the input frequency. Therefore, by suitably selecting the resistance of the charging and discharging resistors $R_{24}$ and $R_{25}$ in the integrator so as to provide the relation $R_{24} > R_{25}$, the output voltage of the converter 2 can be varied approximately as an exponential function of the input frequency and the voltage representative of the approximate vehicle body speed having substantially constant deceleration can be obtained by the discharge occurring in the RC discharge circuit.

Figure 6:
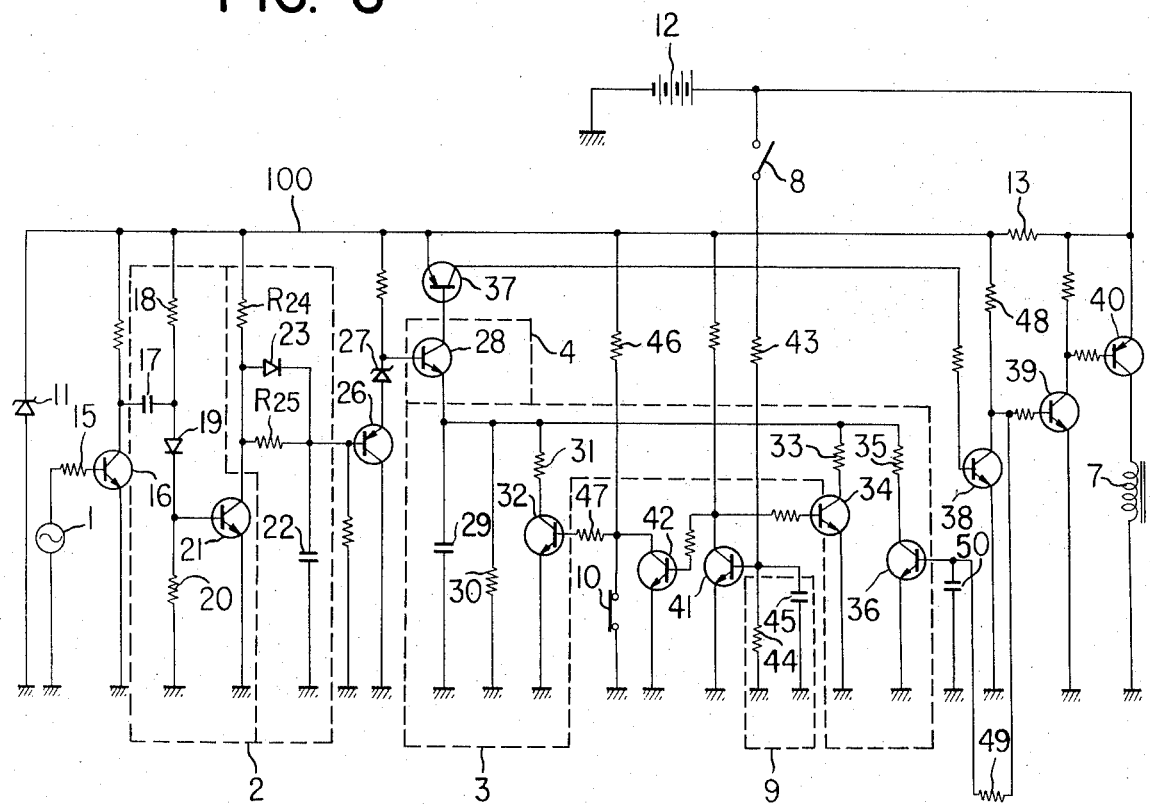
FIG. 6 is an electronic circuit diagram of one practical form of the system according to the present invention.

FIG. 6 shows one practical form of an electronic circuit employed in the present invention.

A power supply 12 which may be the battery in the vehicle supplies voltage requirement to the circuit, and a constant voltage circuit consisting of a Zener diode 11 and a resistor 13 is connected to the power supply 12 for maintaining a constant voltage on a line 100. A wheel speed detector 1 which generates an a.c. voltage having a frequency proportional to the wheel speed is connected across ground and a transistor 16. The output of the wheel speed detector 1 is applied to the base of the transistor 16 through a resistor 15 and is subjected to wave shaping by the transistor 16 to appear as a rectangular waveform signal at the collector of the transistor 16. This output is applied to a pulse train generator which is composed of a capacitor 17, a resistor 18, a diode 19, a resistor 20 and a transistor 21 and which operates in a manner similar to a monostable multivibrator, so that a train of pulse having the same level and pulse width appear at the collector of the transistor 21. The output of the pulse train generator is applied to an integrator which is composed of a capacitor 22, a diode 23, a charging resitor $R_{24}$ and a discharging resistor $R_{25}$. In the integrator, the resistance of the resistor $R_{24}$ is selected to be greater than that of the resistor $R_{25}$ ($R_{24} > R_{25}$) and the resistance ratio therebetween is suitably selected so that the output voltage appearing across the capacitor 22 can vary substantially as an exponential function of the input frequency applied to the integrator as described previously. The pulse train generator and integrator constitute a converter 2 as shown in FIG. 1.

The output of the integrator is connected to the base of a transistor 26, and after impedance conversion by the transistor 26, it is applied to a transistor 28 through a Zener diode 27. The transistor 28 acts as an emitter follower, and thus, a capacitor 29 is charged depending on the base voltage of the transistor 28. The charging of the capacitor 29 is ceased when the base voltage is reduced to a level lower than the emitter voltage of the transistor 28. A resistor 30, a resistor 31 and a transistor 32, a resistor 33 and a transistor 34, and a resistor 35 and a transistor 36 are connected in parallel with the capacitor 29 to serve as discharging resistors for the capacitor 29. The transistor 28, capacitor 29 and discharging resistor group constitute an approximate vehicle body speed signal generator 3 as shown in FIG. 1 and a voltage representative of the approximate vehicle body speed appears at the emitter of the transistor 28.

The collector of the transistor 28 is connected through a transistor 37 to the line 100 and the base voltage of the transistor 28 is compared with the emitter voltage thereof for comparing the output of the converter 2 with the output of the approximate vehicle body speed signal generator 3. More precisely, when the base voltage of the transistor 28 is equal to the emitter voltage thereof, the transistor 28 conducts for compensating the discharge current of the resistors 30, 31, 33 and 35, and the transistor 37 conducts also so that the collector of the transistor 37 is at the high voltage level. When the base voltage of the transistor 28 is reduced to a level lower than the emitter voltage thereof, the transistor 28 is cut off and the transistor 37 is also cut off with the result that the collector voltage of the transistor 37 is equal to the ground potential. Thus, the transistor 28 acts as a comparator and the collector current thereof represents the signal output of the comparator. This comparing system is advantageous over prior art comparing systems employing a differential amplifier in that the circuitry is very simple. Further, due to the fact that the relative error between the output of the converter 2 and the signal representative of the approximate vehicle body speed can be substantially cancelled due to the comparison between the base voltage and the emitter voltage of the transistor 28 and the capacitor 29 is charged in response to the turn-on of the transistor 28, this comparing system is advantageous in that it can operate with high precision and it can be simply adjusted.

In the normal steady running condition in which the anti-skid system is not actuated, the rate of reduction of the base voltage of the transistor 28 (corresponding to the output of the converter 2) is less than the discharge gradient of the emitter voltage of the transistor 28 (corresponding to the output of the approximate vehicle body speed signal generator 3). Thus, the transistor 28 is conducting to turn on the transistor 37, hence a transistor 38, and the collector voltage of the transistor 38 is equal to the ground potential. As a result, transistors 39 and 40 are in the cut-off state and the solenoid 7 is in the deenergized state.

When the wheel speed is reduced due to application of strong braking force which places the anti-skid system in operation, the rate of reduction of the base voltage of the transistor 28 is increased to exceed the discharge gradient of the emitter voltage of the transistor 28. The transistor 28 is cut off thereby cutting off the transistors 37 and 38 and the collector voltage of the transistor 38 takes it high voltage level. As a result, the transistors 39 and 40 conduct to energize the solenoid 7.

The relation between the signal of a brake switch 8, the signal of a vehicle body deceleration switch 10, the brake relaxing signal, and the discharge gradient of the voltage representative of the approximate vehicle body speed will next be described with reference to FIG. 6.

The brake switch 8 is shown as a conventional switch which is normally maintained in the open position when no brake is applied and which is urged to the closed position in response to the application of the brake. The brake switch 6 is in the open position in the state in which the brake is not applied. Thus, the base voltage of a transistor 41 is equal to the ground potential and the transistor 41 is in the cut-off state with its collector at the high voltage level. In this state, the transistor 34 is conducting and the capacitor 29 is discharging with a relatively steep discharge gradient due to the fact that the resistor 33 connected to the transistor 34 is connected in parallel with the resistor 30 in the discharge circuit. Since a transitor 42 is also conducting in such a state, the vehicle body deceleration switch 10 is ineffective. When the brake is applied to urge the brake switch 8 to the closed position, the base voltage is applied to the transistor 41 after a predetermined period of time determined by the resistances of resistors 43 and 44 and the capacitance of a capacitor 45 (that is, the delay time $T_2$ of the timing circuit 9 in FIG. 1) thereby turning on the transistor 41 and the collector voltage of the transistor 41 is reduced to the ground potential level. As a result, the transistors 34 and 42 are cut off, the resistor 33 is isolated from ground, and the function of the vehicle body deceleration switch 10 is restored. The vehicle body deceleration switch 10 is shown as a switch which is in the closed position when the vehicle is running on ground offering low adhesion and which is in the open position when the vehicle is running on ground offering high adhesion. When the vehicle is running on ground offering low adhesion, the transistor 32 is cut off by the switch 10 which is in the closed position, and the resistor 31 is isolated from ground. In response to the opening of the vehicle body deceleration switch 10, the base voltage is applied to the transistor 32 through resistors 46 and 47 with the result that the transistor 32 conducts and the resistor 31 is grounded.

When the collector voltage of the transistor 38 takes its high voltage level, that is, in response to the appearance of the brake relaxing signal, the base voltage is applied to the transistor 36 after a predetermined period of time determined by the resistances of resistors 48 and 49 and the capacitance of a capacitor 50 (that is, the delay time $T_1$ of the timing circuit 5 in FIG. 1) thereby turning on the transistor 36 and the resistor 35 is grounded. When the collector voltage of the transistor 38 is reduced to the ground potential level, the transistor 36 is cut off and the resistor 35 is isolated from ground.

The discharging resistor combination which participates in the discharge operation in response to the appearance and disappearance of the signals above described will now be summarized.
1. The resistors 30 and 33 participate in the operation in the state in which no brake is applied to the vehicle and during the predetermined period of time $T_2$ after the application of the brake.
2. The resistors 30 and 31 participate in the operation when the vehicle continues to run on ground offering high adhesion during the predetermined period of time $T_1$ after the appearance of the brake relaxing signal. On the other hand, the resistor 30 participates solely in the operation when the vehicle continues to run on ground offering low adhesion during the predetermined period of time $T_1$ after the appearance of the brake relaxing signal.
3. The resistors 30, 31 and 35 participate in the operation when the vehicle encounters ground offering high adhesion in the predetermined period of time $T_1$ after the appearance of the brake relaxing signal. On the other hand, the resistors 30 and 35 participate in the operation when the vehicle encounters ground offering low adhesion in the predetermined period of time $T_1$ after the appearance of the brake relaxing signal.

It will be seen that the optimum discharge gradient corresponding to the signals can be established by suitably selecting the resistance values of the resistors 30, 31, 33 and 35.

It will be understood from the foregoing detailed description that the present invention provides a novel and improved anti-skid control system which is simple in circuitry, which is quite economical and which can operate stably with improved performance.

Although the present invention has been described with reference to an oil brake apparatus for vehicles by way of example, it is apparent that the present invention can be applied to vehicles having air brake apparatus.

What is claimed is:
1. An anti-skid control system for vehicles comprising wheel speed detecting means for generating a signal having a frequency proportional to the rotating speed of the wheel or propeller shaft, converting means consisting of means for generating a train of pulses having a frequency proportional to the frequency of the signal generated by said wheel speed detecting means and integrating means connected to the output of said pulse train generating means for converting the signal representative of the rotating speed of the wheel or propeller shaft into a d.c. voltage, approximate vehicle body speed signal generating means including an RC discharge circuit for generating a signal representative of an approximate vehicle body speed due to the discharge occurring in the RC discharge circuit when the rate of reduction of the output of said converting means exceeds the discharge gradient determined by the time constant of said RC discharge circuit, and comparing means for comparing the output of said approximate vehicle body speed signal generating means with the output of said converting means, said integrating means including a charging resistor and a discharging resistor having a suitably selected resistance ratio therebetween so that the output voltage of said converting means can vary approximately as an exponential function of the input frequency applied thereto, whereby the approximate vehicle body speed having substantially constant deceleration can be obtained by the discharge occurring in said RC discharge circuit.

2. An anti-skid control system as claimed in claim 1, wherein said approximate vehicle body speed signal generating means comprises a capacitor to be charged and discharged, discharging resistors for said capacitor, and a transistor which charges said capacitor depending on the output of said converting means but prevents discharge of said capacitor to said converting means, and said discharging resistors are selectively actuated for changing over the discharge gradient for the voltage representative of the approximate vehicle body speed depending on the detected vehicle body deceleration.

3. An anti-skid control system as claimed in claim 1, wherein said approximate vehicle body speed signal generating means comprises a capacitor to be charged and discharged, discharging resistors for said capacitor, and a transistor which charges said capacitor depending on the output of said converting means but prevents discharge of said capacitor to said converting means, and the discharge gradient of the voltage representative of the approximate vehicle body speed is changed over to a greater value when the brake relaxing signal appears from said comparing means and lasts for more than a predetermined period of time.

4. An anti-skid control system as claimed in claim 1, wherein said approximate vheicle body speed signal generating means comprises a capacitor to be charged and discharged, discharging resistors for said capacitor, and a transistor which charges said capacitor depending on the output of said converting means but prevents discharge of said capacitor to said converting means, and the discharge gradient for the voltage representative of the approximate vehicle body speed is changed over to and maintained at a greater value than that used in the case of the application of the brake when no brake is applied to the vehicle and during a predetermined period of time after the application of the brake.

* * * * *

UNITED STATES PATENT OFFICE
CERTIFICATE OF CORRECTION

Patent No. 3,825,799          Dated  July 23, 1974

Inventor(s)  Yoshihiro Matsumura

It is certified that error appears in the above-identified patent and that said Letters Patent are hereby corrected as shown below:

In the heading, correct the spelling of the name of the Assignee to read --Sohgoh Jidosha Anzen · Kogai Gijutsu Kenkyu Kumiai--

Column 2, line 39, change the period (.) to a comma (,) and add --filed February 5, 1973.--.

Column 6, line 25, after "signal" insert --due--.

Column 8, line 50, in the blank space after "2, and" insert -- $f$ --; line 56, after "Thus," insert -- $f$ --.

Column 9, line 1, change "24" to --$R_{24}$--.

Column 11, line 1, change "6" to --8--.

Signed and sealed this 19th day of November 1974.

(SEAL)
Attest:

McCOY M. GIBSON JR.
Attesting Officer

C. MARSHALL DANN
Commissioner of Patents